(12) United States Patent
Guo

(10) Patent No.: US 11,548,141 B2
(45) Date of Patent: Jan. 10, 2023

(54) ROBOT

(71) Applicant: Fanuc Corporation, Yamanashi (JP)

(72) Inventor: Wei Guo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 177 days.

(21) Appl. No.: 16/992,535

(22) Filed: Aug. 13, 2020

(65) Prior Publication Data

US 2021/0122031 A1 Apr. 29, 2021

(30) Foreign Application Priority Data

Oct. 23, 2019 (JP) .............................. JP2019-192688

(51) Int. Cl.
| | |
|---|---|
| *B25J 9/00* | (2006.01) |
| *B25J 9/12* | (2006.01) |
| *B25J 17/00* | (2006.01) |
| *B25J 9/10* | (2006.01) |

(52) U.S. Cl.
CPC ............. *B25J 9/0009* (2013.01); *B25J 9/102* (2013.01); *B25J 9/12* (2013.01); *B25J 17/00* (2013.01)

(58) Field of Classification Search
CPC . B25J 9/0009; B25J 9/102; B25J 9/126; B25J 17/0241
See application file for complete search history.

(56) References Cited

U.S. PATENT DOCUMENTS

| | | | | |
|---|---|---|---|---|
| 4,738,576 A | * | 4/1988 | Eberle .................... | B25J 17/025 901/23 |
| 4,951,517 A | * | 8/1990 | Azuma .................... | F16H 13/02 414/744.5 |
| 5,606,235 A | * | 2/1997 | Mauletti .............. | B25J 17/0241 901/29 |
| 6,699,152 B2 | * | 3/2004 | Tanaka ..................... | F16H 1/32 901/23 |
| 7,785,223 B2 | * | 8/2010 | Haga ........................ | F16H 1/32 475/179 |
| 8,382,629 B2 | * | 2/2013 | Hirata ...................... | F16H 1/32 475/162 |
| 8,444,520 B2 | * | 5/2013 | Nakamura ................ | F16H 1/32 475/162 |
| 9,950,423 B2 | * | 4/2018 | Krumbacher ............ | B25J 9/126 |

(Continued)

FOREIGN PATENT DOCUMENTS

| | | |
|---|---|---|
| EP | 1864765 A1 | 12/2007 |
| JP | H02-237792 A | 9/1990 |

(Continued)

*Primary Examiner* — Joseph Brown
(74) *Attorney, Agent, or Firm* — Shackelford, Bowen, McKinley & Norton, LLP

(57) ABSTRACT

A robot includes one or more rotary joints, each of the rotary joints including a motor, a reducer that reduces the rotational speed of the motor, and a first member and a second member that are connected by the reducer and that are supported so as to be rotatable about a center axis of the reducer. The first member of at least one of the rotary joints is provided with a flange securing portion that secures a flange of the motor at an eccentric position with respect to the center axis of the reducer. Bolts that secure the first member to the reducer are disposed in a region in which the flange is disposed when viewed from a direction along the center axis.

6 Claims, 8 Drawing Sheets

(56) References Cited

U.S. PATENT DOCUMENTS

| | | | |
|---|---|---|---|
| 2002/0066331 A1* | 6/2002 | Okada | F16H 1/32 |
| | | | 901/23 |
| 2008/0287240 A1 | 11/2008 | Hibino et al. | |
| 2008/0295623 A1* | 12/2008 | Kurita | F16H 1/32 |
| | | | 74/25 |
| 2009/0019961 A1* | 1/2009 | Kobayashi | F16H 1/32 |
| | | | 901/29 |
| 2009/0124446 A1* | 5/2009 | Miyoshi | F16H 1/32 |
| | | | 475/163 |
| 2010/0179013 A1* | 7/2010 | Nakamura | B25J 9/102 |
| | | | 475/179 |
| 2011/0028259 A1* | 2/2011 | Miyoshi | F16H 1/32 |
| | | | 475/162 |
| 2013/0047769 A1* | 2/2013 | Long | B25J 9/102 |
| | | | 74/490.01 |
| 2016/0297066 A1* | 10/2016 | Takikawa | B25J 17/00 |
| 2019/0193286 A1* | 6/2019 | Hasuo | B25J 18/007 |
| 2019/0291284 A1* | 9/2019 | Yoneda | B25J 17/025 |
| 2020/0057044 A1* | 2/2020 | Nakamura | G01N 27/06 |
| 2020/0101597 A1* | 4/2020 | Murakami | B25J 9/047 |
| 2020/0324416 A1* | 10/2020 | Collmer | B25J 5/02 |

FOREIGN PATENT DOCUMENTS

| | | | |
|---|---|---|---|
| JP | 2007-075913 A | 3/2007 | |
| WO | WO-2006104216 A1 | 10/2006 | |
| WO | WO-2012073596 A1 * | 6/2012 | B25J 19/0029 |

* cited by examiner

ROBOT

CROSS-REFERENCE TO RELATED APPLICATIONS

This application is based on Japanese Patent Application No. 2019-192688, the contents of which are incorporated herein by reference.

TECHNICAL FIELD

The present invention relates to a robot.

BACKGROUND ART

A joint of a robot includes an actuator that rotationally drives a second member about a prescribed axis with respect to a first member. The actuator includes a motor and a reducer that reduces the rotational speed of the motor, and the first member and the second member are connected by means of the reducer (for example, see PCT International Publication No. WO 2006/104216). In the robot in PCT International Publication No. WO 2006/104216, a center axis of the reducer and a center axis of the motor are coaxially disposed, and bolts that fasten the second member to the reducer are disposed farther outside in a radial direction than a flange of the motor is.

SUMMARY OF INVENTION

An aspect of the present invention is a robot that includes one or more rotary joints, each of the rotary joints including a motor, a reducer that reduces a rotational speed of the motor, and a first member and a second member that are connected by the reducer and that are supported so as to be rotatable about a center axis of the reducer, wherein the first member of at least one of the rotary joints is provided with a flange securing portion that secures a flange of the motor at an eccentric position with respect to the center axis of the reducer, and bolts that secure the first member to the reducer are also disposed in a region in which the flange is disposed when viewed from a direction along the center axis.

DESCRIPTION OF EMBODIMENT

A robot according to an embodiment of the present invention will be described below with reference to the drawings.

The robot according to this embodiment is a vertical articulated-type robot that includes, for example, six rotary joints 1.

Figure 1:
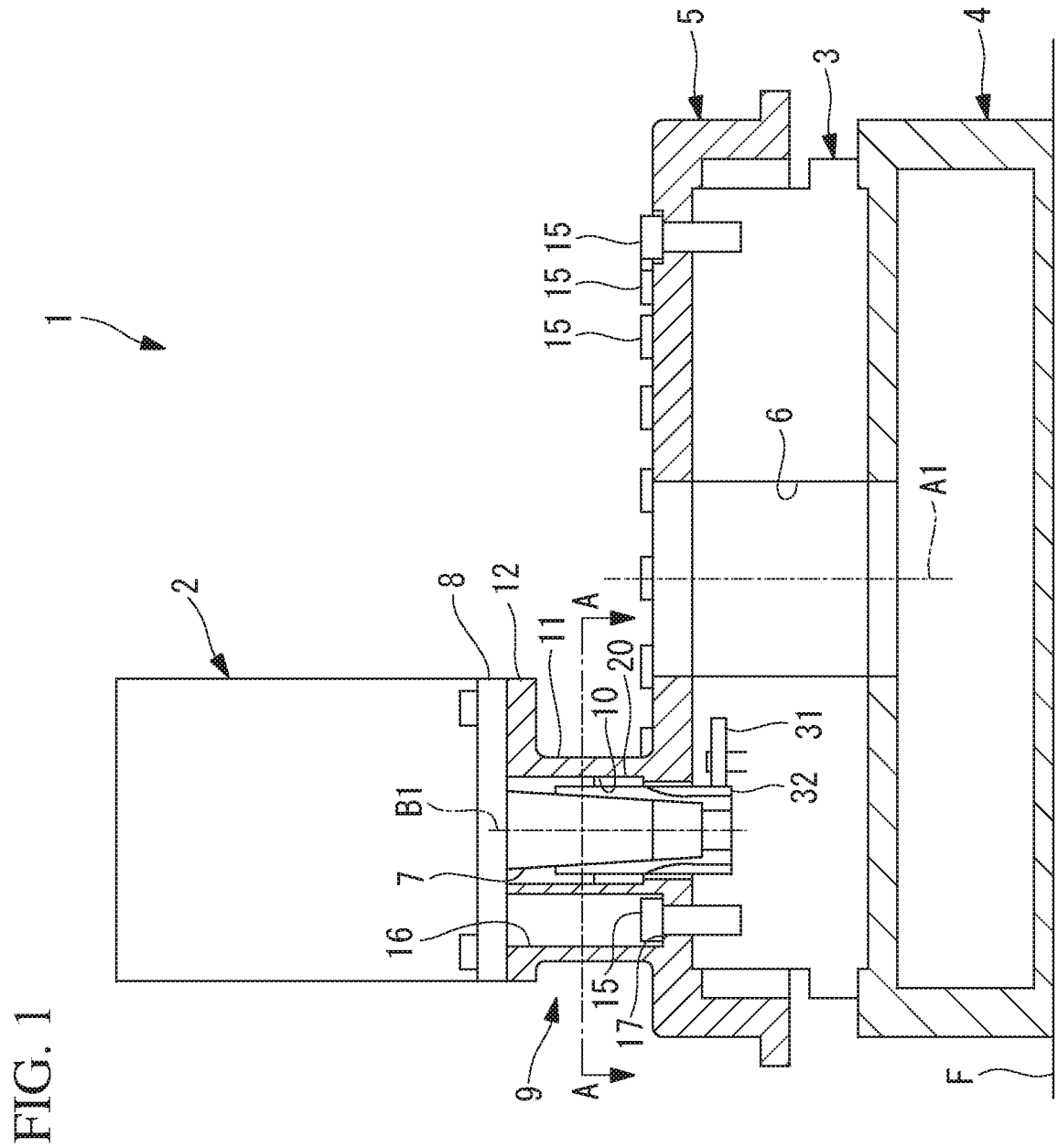
FIG. 1 is a longitudinal sectional view showing one rotary joint of a robot according to an embodiment of the present invention.

As shown in FIG. 1, one of the rotary joints 1 includes: a motor 2; a reducer 3 that reduces the rotational speed of the motor 2; a base (second member) 4 that is installed on a floor surface F; and a turning body (first member) 5 that is supported so as to be rotatable about a vertical axis A1 with respect to the base 4.

The base 4 and the turning body 5 are connected by the reducer 3. As a result, the turning body 5 is supported so as to be rotatable about the vertical axis A1, which is a center axis of the reducer 3, with respect to the base 4. The base 4, the reducer 3, and the turning body 5 are provided with a hollow portion 6 that passes therethrough in the top-to-bottom direction in the vicinity of the vertical axis A1. Accordingly, it is possible to provide a wire body (not shown), such as a cable, in the vicinity of the vertical axis A1 from the base 4 to the turning body 5 via the hollow portion 6.

The motor 2 is disposed at an eccentric position with respect to the vertical axis A1, which is the center axis of the reducer 3, in order to avoid the hollow portion 6. In other words, the turning body 5 is provided with a flange securing portion 9 that secures a flange portion (flange) 8 of the motor 2, with a shaft 7 to which a driving gear 32 that engages with an input gear 31 of the reducer 3 is mounted facing vertically downward, at an eccentric position with respect to the vertical axis A1 so as to avoid the hollow portion 6. In the figure, reference sign B1 is a rotating axis of the shaft 7.

The flange securing portion 9 includes: a cylindrical portion 11 having a center hole 10 through which the shaft 7 of the motor 2 having the driving gear 32 mounted thereto passes; and a securing portion 12 that extends like an outer collar at a top end of the cylindrical portion 11 and that secures the flange 8 of the motor 2. The cylindrical portion 11 and the securing portion 12 are provided integrally with the turning body 5 at an upper portion of the turning body 5.

Figure 2:
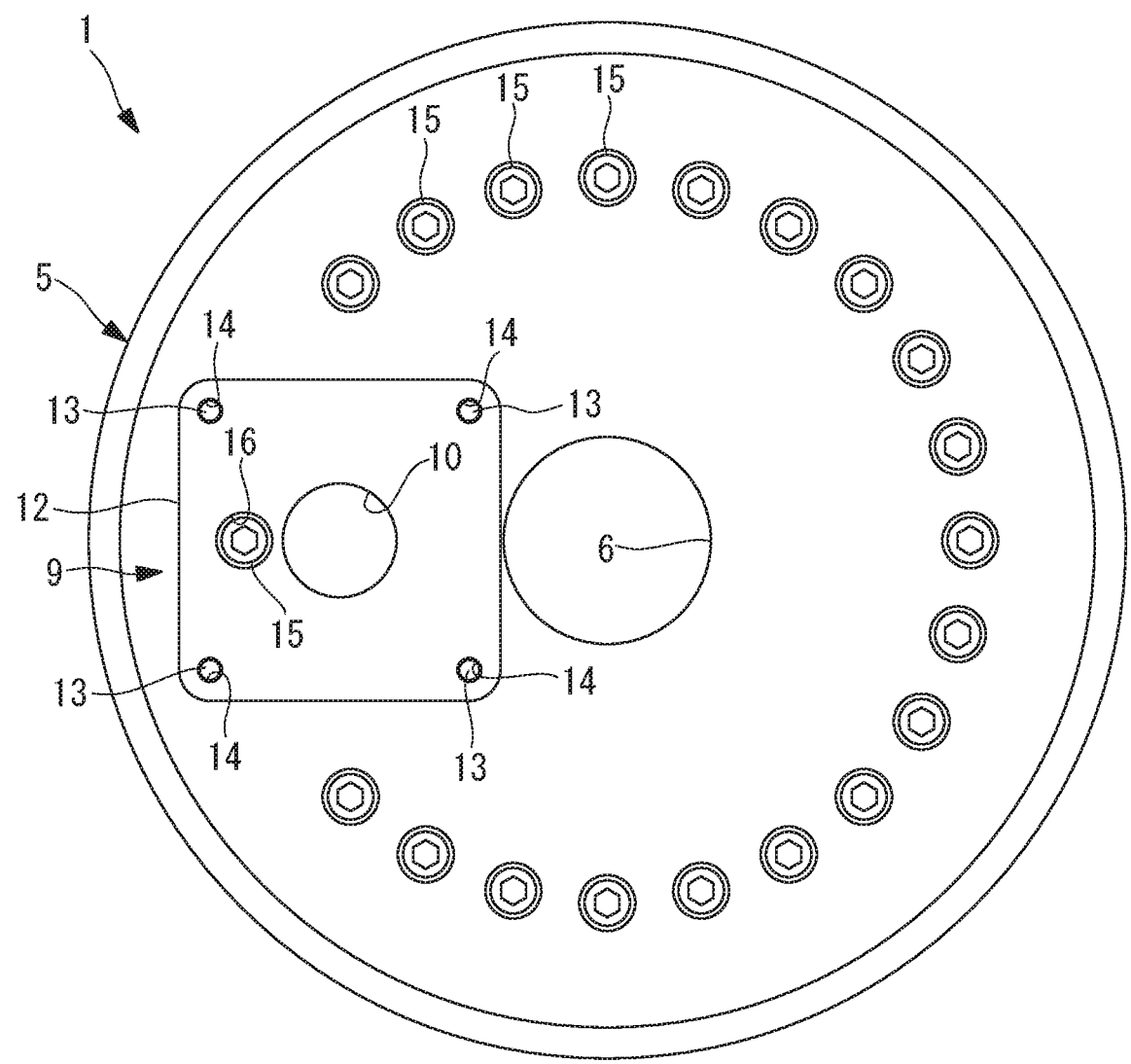
FIG. 2 is a plan view of the rotary joint of the robot in FIG. 1.

As shown in FIG. 2, the securing portion 12 is formed in a rectangular shape having a shape and a size that are substantially equivalent to those of the flange 8 of the motor 2 in plan view. At positions corresponding to four attachment holes (not shown) that are provided in the flange 8 of the motor 2 and through which attaching bolts 13 pass, the securing portion 12 includes four screw holes 14 through which the attaching bolts 13 can be fastened.

Here, as shown in FIGS. 1 and 2, a plurality of bolts 15 are fastened to secure the reducer 3 and the turning body 5 in order to transmit a large torque. In order to avoid the hollow portion 6 at the center and to reduce the number of bolts 15, the bolts 15 are arrayed along a circumferential direction at positions close to the outer circumference of the reducer 3. In FIGS. 1 and 2, the bolts 15 are arrayed in a single row along a single circle in order to simplify the illustration; however, the manner in which the bolts 15 are arrayed is not limited thereto, and the bolts 15 may be arrayed in multiple rows or, without forming a row, in a donut-shaped region in a radially outer area of the hollow portion 6.

Also, because the flange securing portion 9 is disposed, as described above, at the eccentric position with respect to the vertical axis A1, which is the center axis of the reducer 3, the flange securing portion 9 is disposed at a position overlapping with the circle in which the bolts 15 are arrayed, as shown in FIG. 2.

With the robot according to this embodiment, the turning body 5 and the reducer 3 are fastened by means of the bolts 15 also in the region in which the securing portion 12 of the flange securing portion 9 is disposed in a plan view, as shown in FIG. 2.

In other words, a through-hole 16 that passes through the flange securing portion 9 in a vertical direction is also provided in the region in which the securing portion 12 is disposed, as shown in FIGS. 1 and 2. A seat surface 17 against which a head portion of a bolt 15 abuts is formed inside the through-hole 16.

Figure 3:
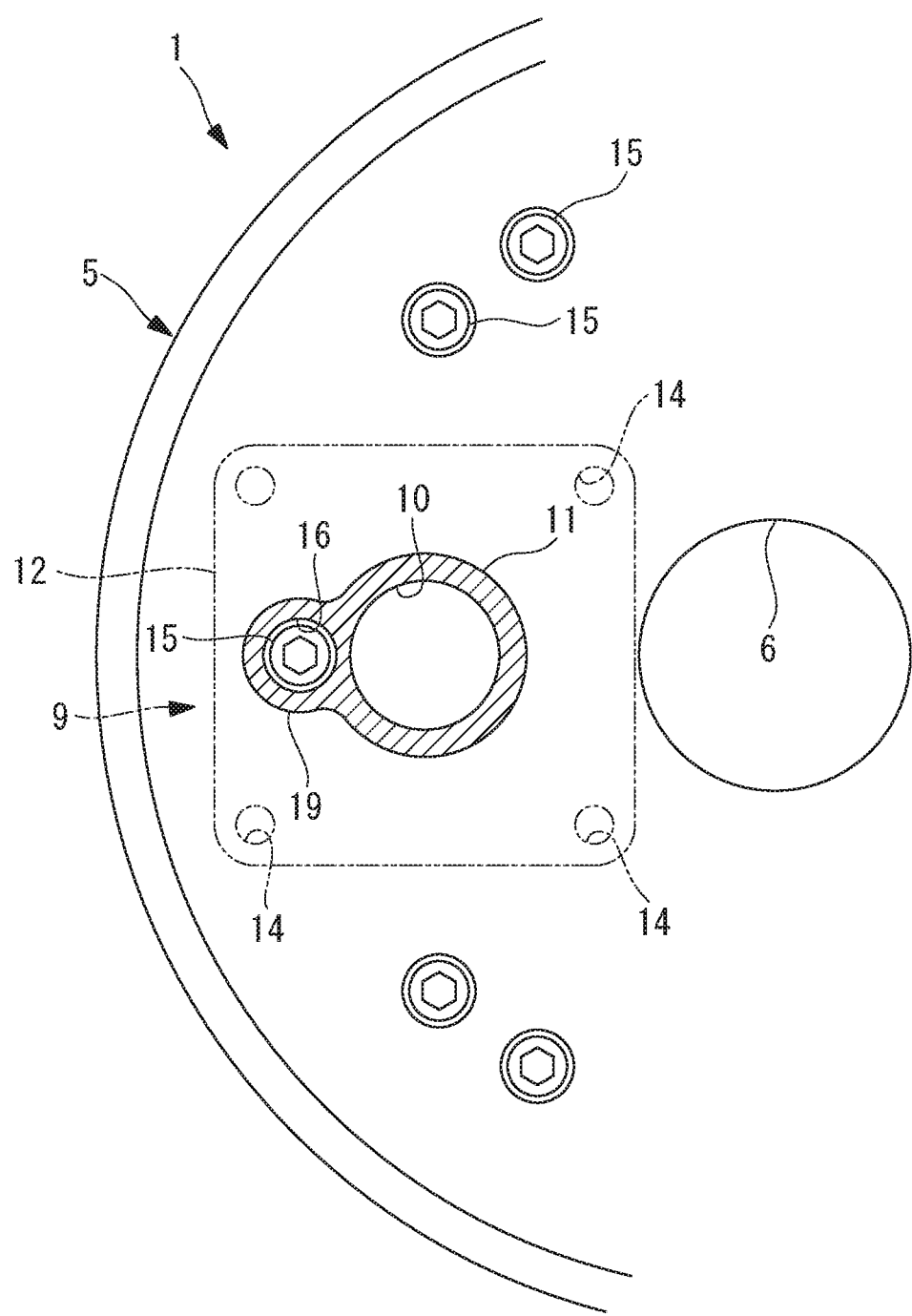
FIG. 3 is a cross-sectional view taken along a cut line A-A in FIG. 1.

FIG. 3 shows a cross-sectional view taken along a cutting line A-A in FIG. 1. In the example shown in FIG. 3, the flange securing portion 9 is provided with a single through-hole 16 at a position overlapping with the cylindrical portion 11.

Figure 4:
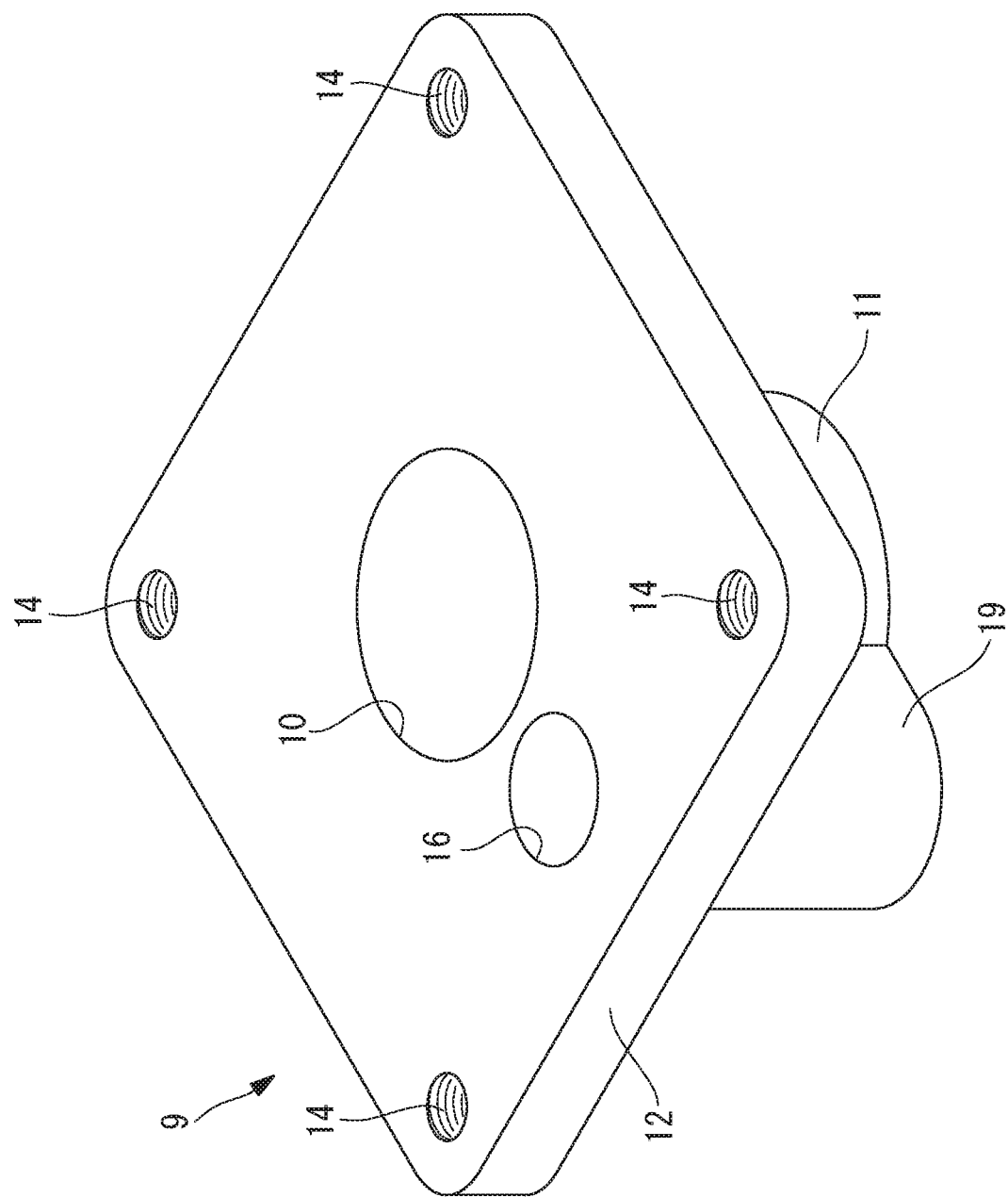
FIG. 4 is a perspective view showing a flange securing portion of the robot in FIG. 1.

With this embodiment, as shown in FIGS. 3 and 4, an overlaid portion 19 for ensuring a sufficient wall thickness in an area surrounding the through-hole 16 along the vertical direction is provided on an outer circumferential surface of the cylindrical portion 11. As shown in FIG. 1, a needle bearing 20 that supports the shaft 7 of the motor 2 in a rotatable manner with respect to the center hole 10 is disposed in the center hole 10 of the cylindrical portion 11.

With the thus-configured robot according to this embodiment, the bolts 15 that secure the turning body 5 and the reducer 3 keep the turning body 5 and the reducer 3 in firm contact also in the region in which the flange 8 of the motor 2 is disposed in plan view. As a result, the flange securing portion 9 prevents a situation in which the turning body 5 and the reducer 3 are not fastened over a large angular area, and thus, there is an advantage in that it is possible to prevent a reduction in rigidity of the robot.

Also, in order to make this possible, the overlaid portion 19 is provided on the outer surface of the cylindrical portion 11, as shown in FIGS. 3 and 4, and the diameter of the center hole 10 is reduced, as shown in FIG. 1, by employing the needle bearing 20, and, as a result, it is possible to ensure a sufficient wall thickness in the area surrounding the through-hole 16 through which the bolt 15 passes.

Figure 5:
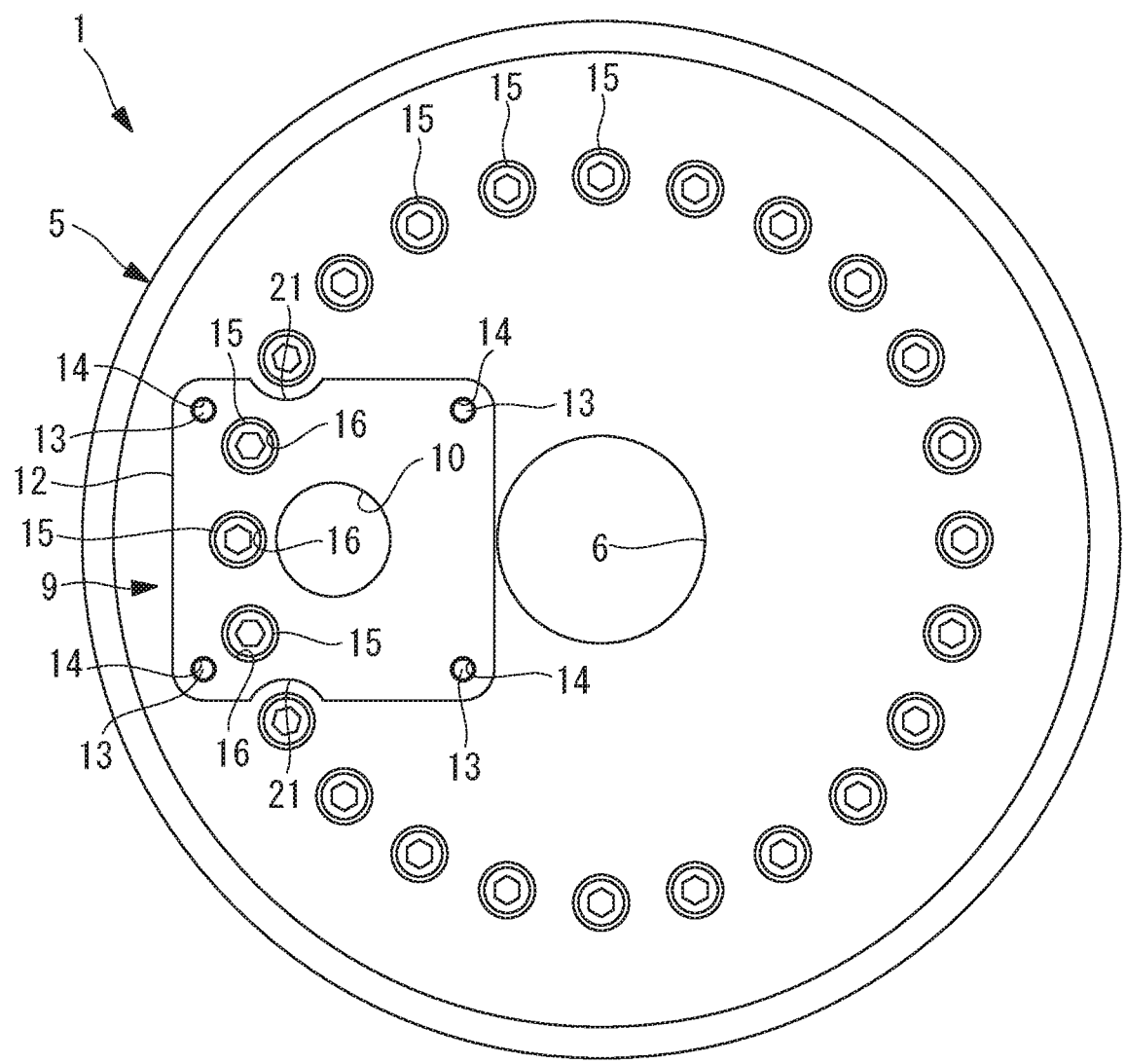
FIG. 5 is a plan view showing a modification of the rotary joint of the robot in FIG. 2.
Figure 6:
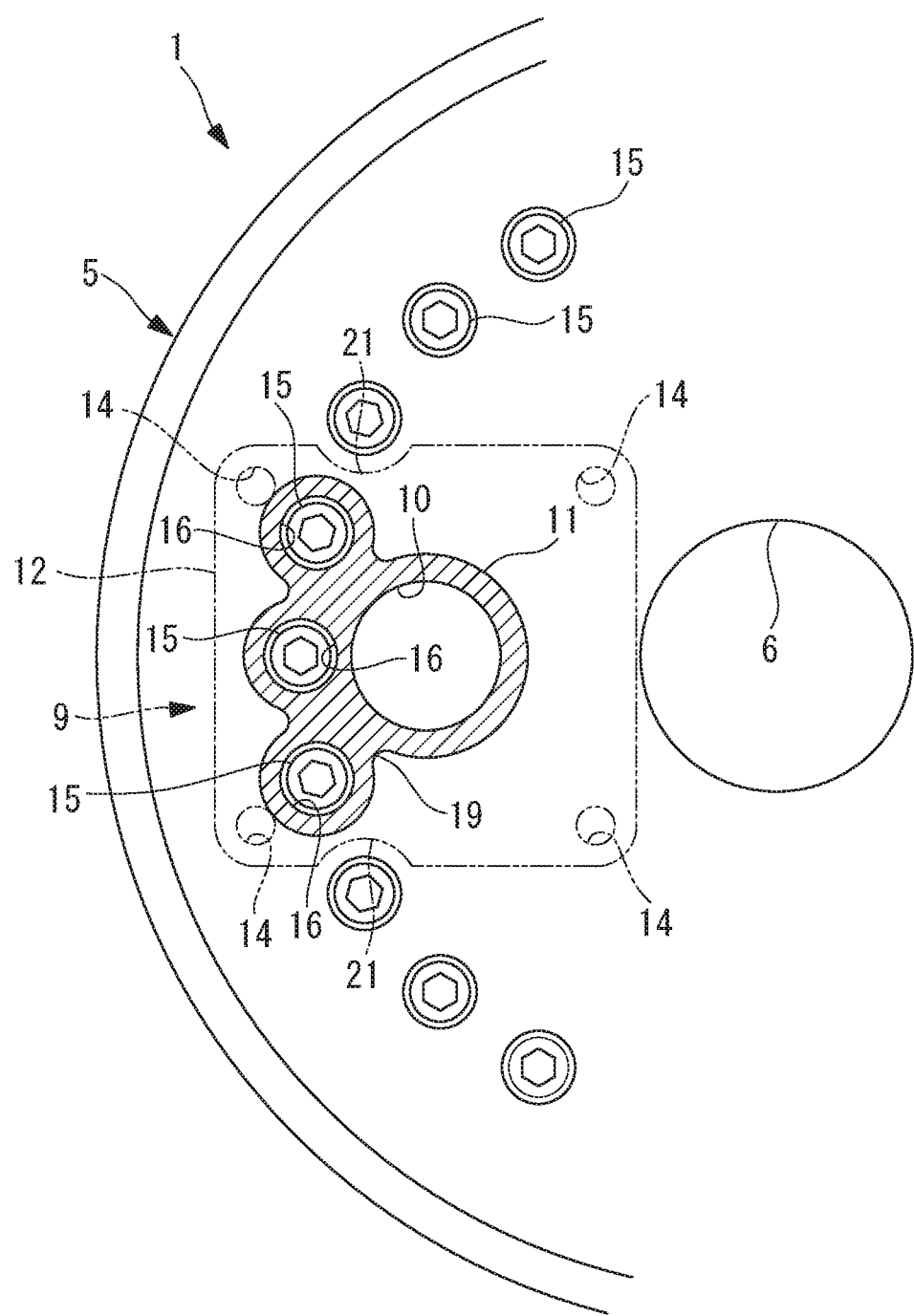
FIG. 6 is a cross-sectional view of the rotary joint in FIG. 5, which is similar to FIG. 3.

In this embodiment, an example in which the through-hole 16 that passes through the flange securing portion 9 in the vertical direction and through which the bolt 15 passes is provided at one location in the flange securing portion 9 has been described; however, alternatively, the through-holes 16 may be provided at multiple locations, as shown in FIGS. 5 and 6. By doing so, it is possible to keep the turning body 5 and the reducer 3 in firmer contact.

In this case, in portions close to the outer circumference of the securing portion 12, notched portions 21 that allow the bolts 15 to pass therethrough may be provided by forming notches in outer peripheral edges of the securing portion 12, as shown in FIG. 5.

In this embodiment, the securing portion 12 of the flange securing portion 9 is formed in a rectangular shape having a shape and size that are substantially equivalent to those of the flange 8 of the motor 2, and the screw holes 14 are provided at four locations. Alternatively, notches may be formed in the outer peripheral edges of the securing portion 12 at the positions of the screw holes 14, and the screw holes 14 may be provided at three locations (or two locations).

Figure 7:
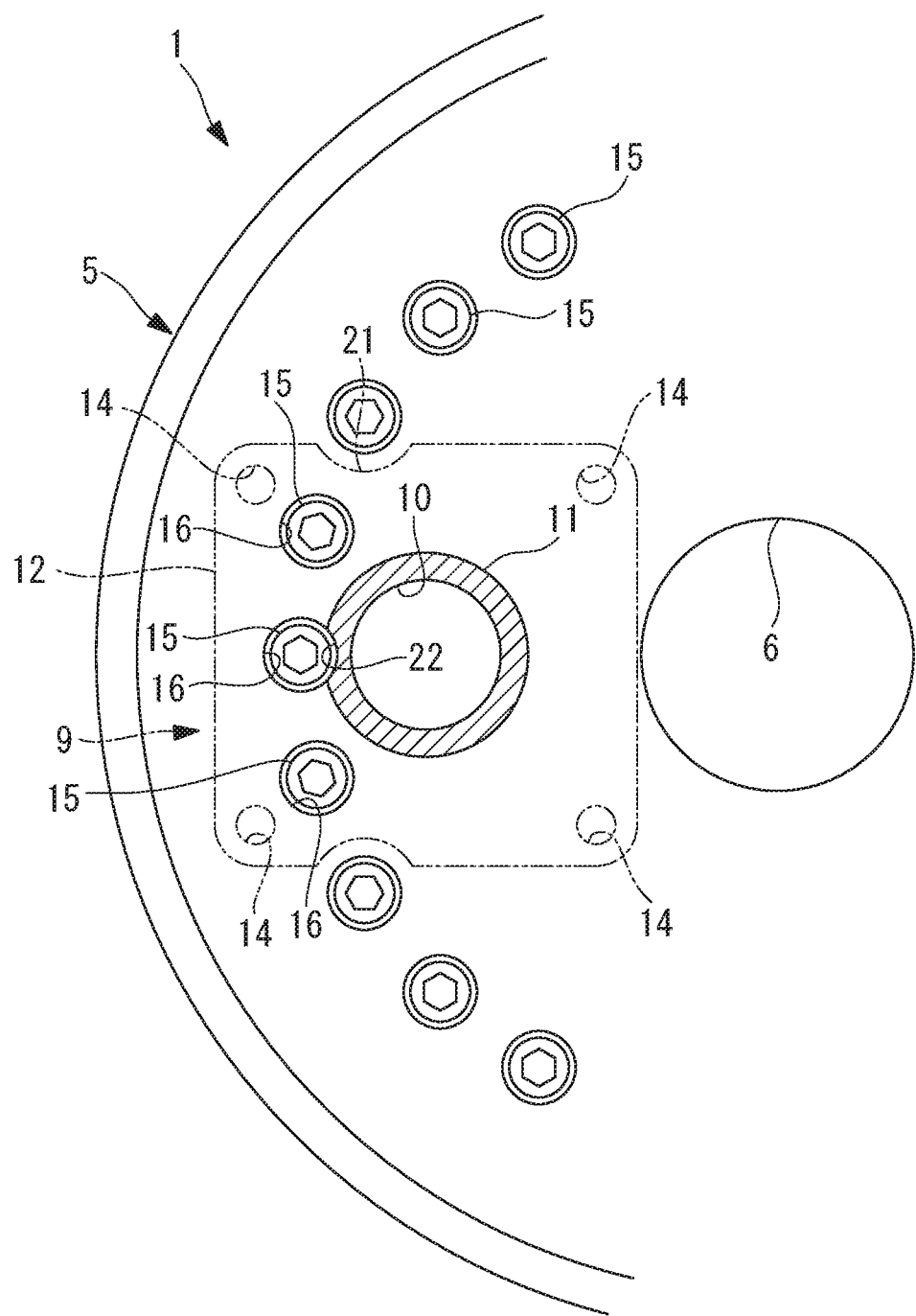
FIG. 7 is a cross-sectional view showing a modification of FIG. 6.

A sufficient wall thickness is ensured in the area surrounding the through-hole 16 by providing the overlaid portion 19 on the outer circumferential surface of the cylindrical portion 11 of the flange securing portion 9; however, alternatively, a notched portion 22 that allows the bolt 15 to pass therethrough may be provided in an outer circumferential surface of the cylindrical portion 11, as shown in FIG. 7.

In this embodiment, an example in which the present invention is applied to the rotary joint 1 provided between the base 4 and the turning body 5 of a vertical articulated-type robot has been illustrated; however, alternatively, the present invention may be applied to another rotary joint or one or more rotary joints. The present invention may be applied to a robot of another arbitrary type, such as a horizontal articulated-type robot.

Figure 8:
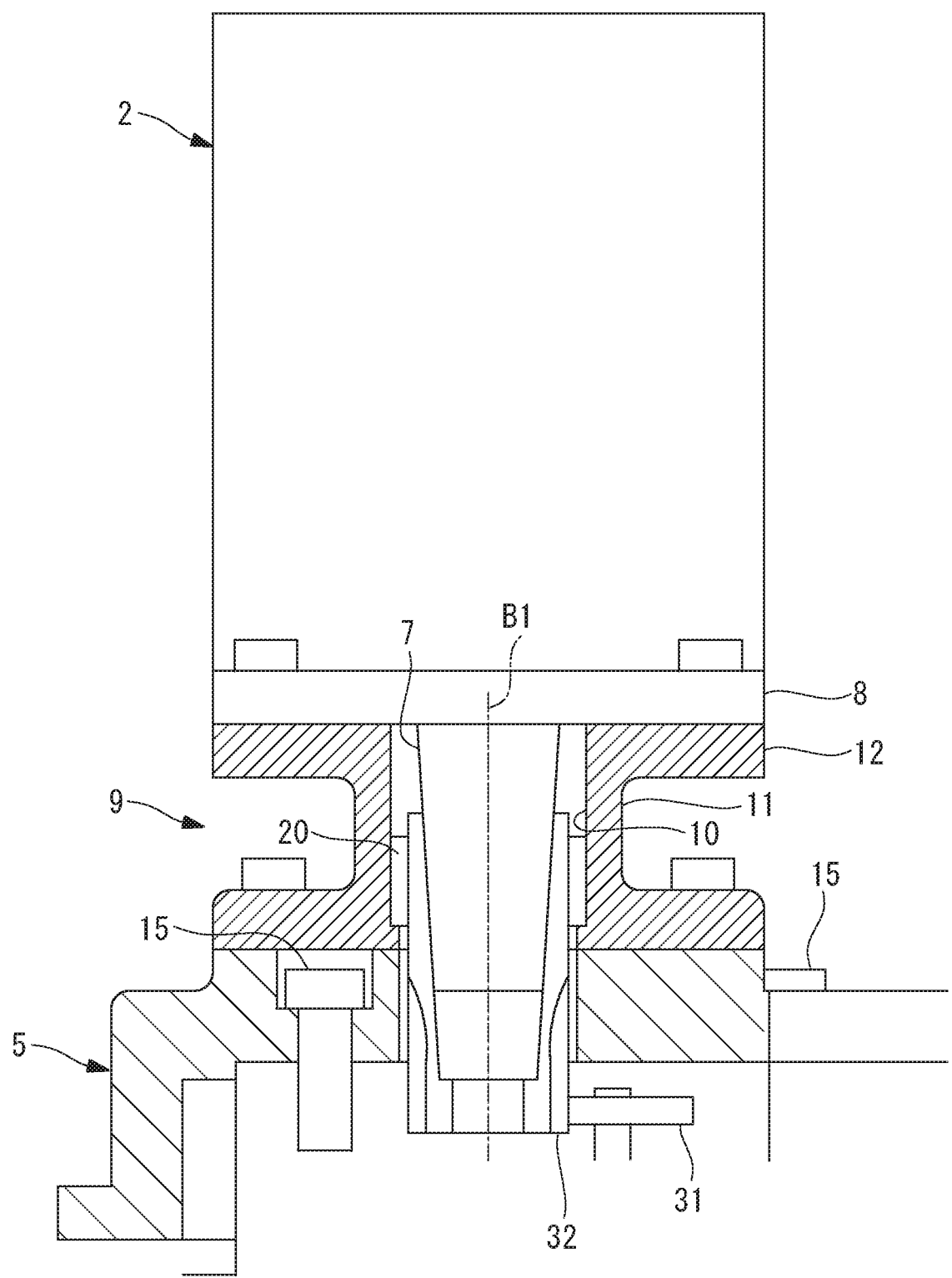
FIG. 8 is an enlarged longitudinal sectional view showing another modification of the rotary joint of the robot in FIG. 1.

In this embodiment, the flange securing portion 9 is provided integrally with the turning body 5; however, the flange securing portion 9 may be detachably secured to the turning body 5 by means of the bolts 15, as shown in FIG. 8. In this case, because the turning body 5 and the reducer 3 may be fastened by means of the bolts 15 in a state in which the flange securing portion 9 is removed from the turning body 5, it is not necessary to provide the through-hole 16 through which a bolt 15 passes, in the flange securing portion 9.

REFERENCE SIGNS LIST

1 rotary joint
2 motor
3 reducer
4 base (second member)
5 turning body (first member)
7 shaft
8 flange portion (flange)
9 flange securing portion
10 center hole
11 cylindrical portion
12 securing portion
15 bolt
16 through-hole
19 overlaid portion
20 needle bearing
21,22 notched portion
A1 vertical axis (center axis)

The invention claimed is:

1. A robot comprising one or more rotary joints,
each of the one or more rotary joints comprising:
a motor;
a reducer that reduces a rotational speed of the motor;
a first member; and
a second member;
wherein the first member and the second member are connected by the reducer and are supported so as to be rotatable about a center axis of the reducer;
wherein the first member of at least one of the one or more rotary joints is provided with a flange securing portion that secures a flange of the motor at an eccentric position with respect to the center axis of the reducer;
wherein the flange securing portion comprises:
an outer collar at an end thereof opposite the reducer in a direction of the center axis and that mates with the flange of the motor;
a cylindrical portion extending from the outer collar toward the reducer in the direction of the center axis; and
wherein the outer collar extends from the cylindrical portion perpendicularly to the direction of the center axis and is spaced apart from the first member in the direction of the center axis by the cylindrical portion;

wherein bolts that secure the first member to the reducer are disposed in a region in which the flange is disposed when viewed from a direction along the center axis and inserted into one or more through-holes that pass through the flange securing portion in the direction along the center axis; and wherein an overlaid portion having a wall thickness in an area surrounding a through-hole of the one or more through-holes in the direction along the center axis is provided on an outer circumferential surface of the cylindrical portion.

2. The robot according to claim 1, wherein the cylindrical portion has a center hole through which a shaft of the motor passes.

3. The robot according to claim 2, wherein a notched portion for avoiding interference with the bolts is provided in the direction along the center axis on an outer circumferential surface of the cylindrical portion.

4. The robot according to claim 2, wherein a needle bearing that supports the shaft inserted in the center hole in a rotatable manner is provided in the cylindrical portion.

5. The robot according to claim 1, wherein the flange securing portion is detachable from the first member; and the flange securing portion is attachable to the first member after the first member and the reducer have been fastened via the bolts in a state in which the flange securing portion is not mounted to the first member.

6. The robot according to claim 1, wherein the flange securing portion and the first member are integral.

* * * * *